(12) United States Patent
Hawkins

(10) Patent No.: US 6,588,969 B2
(45) Date of Patent: Jul. 8, 2003

(54) ADHESIVE STRENGTHENING EMBEDDED MICROMACHINES

(75) Inventor: Gary F. Hawkins, Torrance, CA (US)

(73) Assignee: The Aerospace Corporation, El Segundo, CA (US)

(*) Notice: Subject to any disclaimer, the term of this patent is extended or adjusted under 35 U.S.C. 154(b) by 0 days.

(21) Appl. No.: 09/928,562

(22) Filed: Aug. 13, 2001

(65) Prior Publication Data

US 2003/0031507 A1 Feb. 13, 2003

(51) Int. Cl.⁷ .................. F16B 11/00; F16B 12/04; F16L 13/00
(52) U.S. Cl. .................. 403/267; 428/67; 428/374
(58) Field of Search .................. 403/267; 428/67, 428/332, 364, 369, 374

(56) References Cited

U.S. PATENT DOCUMENTS

| | | | | |
|---|---|---|---|---|
| 5,370,913 A | * | 12/1994 | Lin | 428/13 |
| 5,573,344 A | * | 11/1996 | Crane et al. | 403/179 |
| 5,785,092 A | * | 7/1998 | Friedrich et al. | 138/133 |
| 6,080,347 A | * | 6/2000 | Goulait | 264/167 |
| 6,108,210 A | * | 8/2000 | Chung | 361/747 |
| 6,447,871 B1 | * | 9/2002 | Hawkins | 428/67 |

* cited by examiner

Primary Examiner—Lynne H. Browne
Assistant Examiner—Jori Schiffman
(74) Attorney, Agent, or Firm—Derrick Michael Reid

(57) ABSTRACT

A micromachine is embedded into an adhesive film for increasing the shear strength of the adhesive used to form a bonding joint. The micromachine has an irregular shaped cross section, such as a trapezoid, so that when the micromachine tends to rotate between two bonded adherents, a surface portion of the micromachine tends to penetrate into and compress the adhesive towards a bonding interface with the constrained adherent for increasing the shear strength of the bonding joint.

16 Claims, 3 Drawing Sheets

ADHESIVE COMPRESSING LEVER SYSTEM

ADHESIVE COMPRESSING LEVER SYSTEM

MULTIPLE LEVER ADHESIVE COMPRESSING MACHINE

DOUBLE ADHESIVE COMPRESSING LEVER SYSTEM

SINGLE LEVER ADHESIVE COMPRESSING MACHINE

ADHESIVE STRENGTHENING EMBEDDED MICROMACHINES

REFERENCE TO RELATED APPLICATION

The present application is related to applicant's copending application entitled "Composite Materials Having Embedded Machines" Ser. No. 09/407,039, filed Sep. 27, 1999 by the same inventor.

FIELD OF THE INVENTION

The invention relates to the field of adhesive materials. More particularly, the present invention relates to embedded compressive lever machines for increasing the strength of adhesive bondlines by modifying the internal stresses.

BACKGROUND OF THE INVENTION

Adhesives have long been used to bond elements together. Filler material is typically added to adhesives to form suitable adhesive layers for bonding adherents together. For example, film epoxy adhesives contain fillers of various kinds to control thixotrophy, regulate flow of the adhesive during the cure cycle and enhance mechanical properties of the adhesive. Typical fillers include aluminum powder, calcium carbonate, mica, colloidal silica fibers, and glass fibers. Hard brittle adhesive systems can be modified by the use of fillers to increase toughness and consequently increase the peel properties of the adhesive. In addition, glass spheres can be added to reduce density or control the bondline thickness. None of the fillers used to date intentionally modify the internal stresses in the adhesive.

There are many advantages to using stronger adhesives. Increasing the strength of adhesives will be beneficial to joint bondings. When used in an existing joint design, an increased strength adhesive would add reliability to the part. A stronger part would have a higher factor of safety. Consequently, the joint would be more reliable during overloading or during deficiencies in the joint design. To take full advantage of the increased strength, new joint designs could be made smaller, more efficient and lighter than existing joints. When the adhesive strength is greatly increased, entirely new areas of technology can be envisioned where adhesives replace other methods of joining technology.

Typical bonded structures are designed so that the structural adhesive will be under shear loading most of the time. Adhesives are typically stronger under shear stresses than in tensile or peel loading. An adhesively bonded structure is considered in shear when the applied load acts in the plane of the adhesive layer. These loads tend to produce sliding of the adherents and this sliding results in sliding or shearing of the adhesive under shear stresses. These shear stresses function differently than pure shear stresses that are typically experienced by uniform blocks of homogenous material. Interactions between the adhesive thickness, adherent thickness, yield strength, and bond geometry produce nonuniform stresses. When nonuniform stresses occurs, tensile stresses rather than shear stresses may actually dominate the failure mode of the adhesive joints. Consequently, the joints may fail at a lower load than expected when the adhesive cannot also support high unwanted tensile loads. It is desirable to increase the shear strength of bonding joints to support increase shear stresses as well as unwanted tensile loads.

Recently, micromechanical systems have been adapted to provide embedded machines to augment composites. One class of materials contains embedded micromachines directed to modifying the properties of a composite material. Another class of embedded MEMS machines are fluid filled machines directed to specific applications where fluid filled machines are used to increase the damping properties of composites. These embedded machines have not been adapted to increase the shear strength of bondlines of a bonding adhesive. These and other disadvantages are solved or reduced using the invention.

SUMMARY OF THE INVENTION

An object of the invention is to increase the shear strength of a bonding adhesive.

Another object of the invention is to increase the shear strength of a bonding adhesive using a micromachine.

Yet another object of the invention is to increase the shear strength of a bonding adhesive using an embedded micromachine that increases pressure upon the bonding adhesive orthogonally to shear load stresses.

Yet another object of the invention is to increase the shear strength of a bonding adhesive using an embedded lever micromachine that increases the compressive forces and presses upon the bonding adhesive orthogonally to shear load stresses.

The invention is directed to lever micromachines that are embedded in an adhesive bondline. Small micromachine levers are an added component into the adhesive film before the adhesive is cured in a bondline. The embedded levers tend to rotate under shear loads and during rotation applied pressure on the adhesive interface. The force caused by the levers creates a biaxial load on the adhesive interface consisting of a combination of compressive and shear stresses. The compressive component eliminates the tensile stress typically present in the bondline consequently eliminating the peel stresses. The peel stresses that may otherwise cause the adhesive bondlines to fail prematurely are eliminated thereby increasing the bondlines strength. In addition, the strength increase is large because the bondlines are in compression and many adhesives are much stronger when in compression.

The embedded lever micromachines increases the strength of adhesive bondlines allowing joints to be stronger and safer. Preferably, substantially identical micromachine levers are embedded inline in an adhesive material film so that several levers rotate concurrently for uniform compression along the adhesive bondline. Each lever machine is designed to rotate under shear loading. The rotation causes the top and bottom faces of the micromachine levers to compress the adhesive film at the interface to the adherents. Consequently, the adhesive is simultaneously under the influence of shear and compressive forces. The adhesive under the compressive forces is capable of carrying higher loads with higher shear strength without the influence of tensile forces. These and other advantages will become more apparent from the following detailed description of the preferred embodiment.

DETAILED DESCRIPTION OF THE PREFERRED EMBODIMENT

Figure 1:
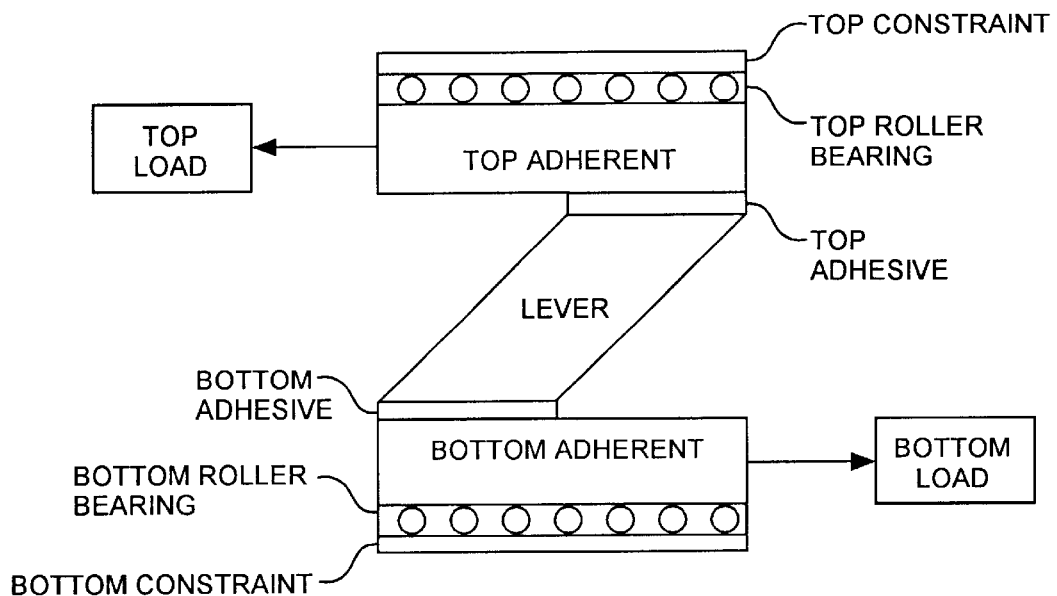
FIG. 1 is a diagram of an adhesive compressing lever system.

An embodiment of the invention is described with reference to the figures using reference designations as shown in the figures. Referring to FIG. 1, a top constraint and a bottom constraint are used to constrain together a top adherent and a bottom adherent between which is disposed a lever. The lever is bonded to the top adherent using a top adhesive and is bonded to the bottom adherent using a bottom adhesive. The top and bottom adhesives are adhesive films respectively having a bonding interface with the top and bottom adherent. A top load and a bottom load are respectively applied to the top and bottom adherents in opposite directions so as to apply shear stresses upon the top and bottom adhesives. For purpose of illustration, top and bottom roller bearings are respectively disposed between the top constraint and top adherent and between the bottom constraint and the bottom adherent for lateral bearing movement of the top and bottom adherent under the shear load applied by the top and bottom loads. As shown, the lever is preferably in the shape of a trapezoid having a top outer surface interacting with the top adhesive and a bottom outer surface interacting with the bottom adhesive. The lever is a solid material, such as a rigid metal, in the trapezoidal shape for rigid compressive rotation. The top outer surface is displaced from the bottom outer surface such that when the lever is rotated about a center point of the lever when the loads are applied, the right side of the top outer surface of the lever moves up and into the top adhesive for applying a compressive force upon the top adhesive, as the left side of the bottom outer surface of the lever moves down and into the bottom adhesive concurrently applying a compressive force upon the bottom adhesive. Shear forces of the applied top and bottom loads cause the rotation of the lever to apply the compressive forces upon the top and bottom adhesive. When the shear load force is applied on the constrained adherents and adhesives, the lever rotates slightly into the adhesive causing compressive forces in the adhesive. When compressing the adhesive by the lever, the shear strength of the adhesive Increases producing a stronger joint comprising the adhesives between the two adherents. The adhesive compressive lever system is well suited for bonding together the top and bottom adherents that may be bonded plates in an arbitrary mechanical system.

Figure 2:
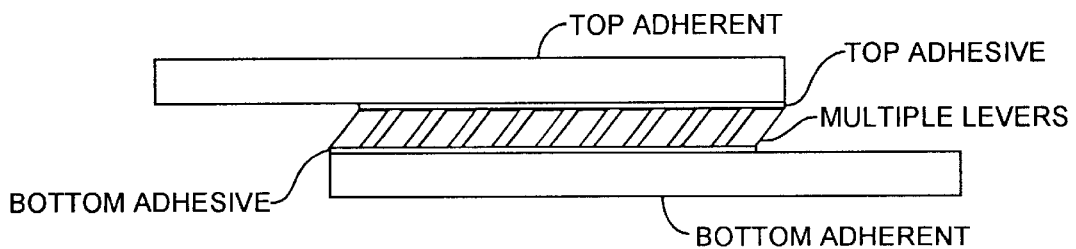
FIG. 2 is a diagram of a multiple lever adhesive compressing machine.

Referring to FIG. 2, a multiple lever adhesive machine is shown between the top and bottom adhesive respectively interfacing with the top and bottom adherents. Many complete adhesive systems are naturally constrained, such as when bonding one tube inside of another tube, consequently, the constraints and applied loads of a complete system are not shown for convenience. When a plurality of levers is lined up and bonded between the two adherents, each of the levers will cause a respective compressive force along the bondline of the top and bottom adhesives. The inline multiple lever function to apply a uniform compressive force along the length of the bondline for increased shear strength.

Figure 3:
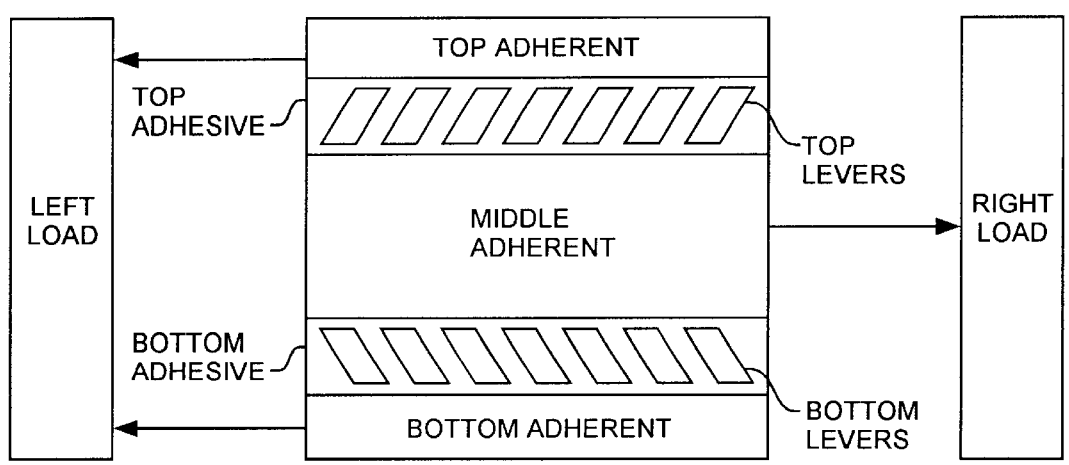
FIG. 3 is a diagram of double adhesive compressing lever system.

Referring to FIG. 3, a double adhesive compressing lever system is shown having a left load applied to the top and bottom adherents and having a right load applied to a middle adherent. The top and bottom adhesive films respectively embedded a plurality of top levers and a plurality of bottom levers. Top levers and bottom levers have a trapezoidal cross section with the top levers slanting right and with the bottom levers slanting left. When the loads are applied, the top levers tend to rotate counterclockwise as the bottom levers tend to rotate clockwise so as to concurrently apply respective compressive forces upon the top and bottom adhesives at the respective interfaces to the adherents so as to increase the shear strength of the adhesive. The double adhesive compressing lever system can be adaptive so that the top and bottom adherents for a tube and the middle adherent is a core where the embedded lever adhesives serves a joint to secure the core in the tube. In this configuration, the levers may be formed by concentric rings or by a helix coil. The levers can be made very small so that the levers can be embedded in exceedingly thin adhesive film layers of the top and bottom adhesives.

Figure 4:
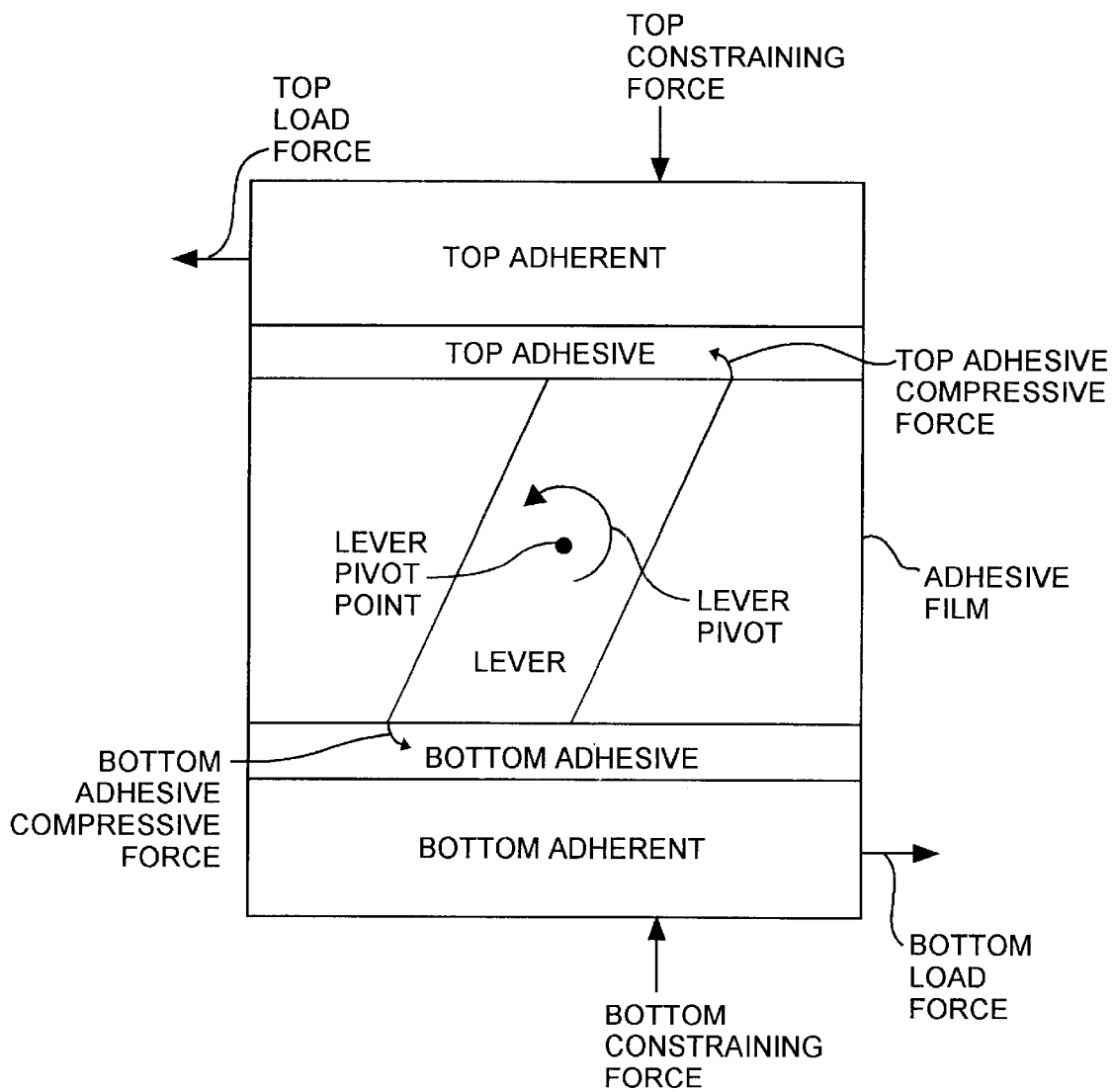
FIG. 4 is a diagram of a Single Lever Adhesive Compressing Machine.

Referring to FIG. 4, the lever is disposed in an adhesive film including a top adhesive layer and a bottom adhesive layer. A top load force and a bottom load force are applied in opposite directions respectively upon the top adherent and the bottom adherent, which are held in position by a top constraining force and a bottom constraining force, as might be applied by a top constraint and a bottom constraint. As the top load force is applied, the top load force tends to pull in a certain direction, as, at the same time, the bottom load force is applied in the opposite direction, which tends to pull the bottom adhesive layer in that opposite direction. When the top and bottom adhesive layers are pulled in opposite directions, the lever, that is embedded in the adhesive film, tends to rotate, that is pivot, about a center pivot point. As the lever tends to pivot about the pivot point, a top point of the lever tends to push into the top adhesive layer, as, at the same time, a bottom point of the lever tends to push into the bottom adhesive layer. As the lever top point pushes into the top adhesive layer as the lever bottom point pushes into the bottom adhesive, a top adhesive compressive force is applied to the top adhesive layer and a bottom adhesive compressive force to the bottom adhesive layer. The top and bottom compressive forces are orthogonal to the top and bottom load forces. The top and bottom compressive force tends to improve the bonding of the top and bottom adhesive layers for improved adhesive bonding in the presence of the top and bottom load forces. As such, the embedded lever machine translates load forces applied to the adhesive layers, that would otherwise tend to fail the adhesive layers in shear, but now serve to create additional orthogonal compressive forces upon the adhesive layers for improving the adhesive bond in shear.

In addition to eliminating peel failures of the adhesive, the compressive forces make the adhesive material effectively stronger. Many polymer materials obey failure criteria that states that the yield strength is higher in compression than in tension. More formally, according to this criterion, the failure strength depends on the applied mean or equivalently the hydrostatic stress. In a material obeying this Mohr-Coulomb criterion, the shear strength increases linearly as the compressive stress increases. When the machines are embedded in an adhesive that obeys this criterion, the strength of the bond will increase as the load increases. This of course applies up to some limiting strength that can be several times the failure value without compression.

The levers may be made from steel stock material that is slotted at regular dimensional intervals at an angle, then cut and embedded in an adhesive film that is then cured. A system with and without the embedded adhesive has been tested for shear strength for comparison purposes. The adhesive samples with embedded micromachine levers provide 78% stronger shear strength. In addition, the levers can be made with the slanted surfaces oriented backwards to verify that the geometry of the micromachine levers is causing a shear strength increase that is not caused merely by the presence of the machines. The machines are designed to create a compressive force in the bondline. This force tends to separate the adherents thereby reducing the compressive force. An external clamp can be used for constraining the adhesive to the adherents. In practice, the entire joint design will be optimized to take full benefit of the embedded machines.

The size, angle, material, and exact shape of the machines may vary. The defining characteristic is that the machines tend to rotate when shear forces are applied to the adherents. The shear forces cause the lever to tend to rotate about a center point. When the lever has a first portion of an surface that is at a greater radial distance from the center point than another portion of the surface, then the first portion is disposed to produce the compression force during rotation. Here, using the trapezoidal preferred shape, the top surface has a corner that is a radial distance from the center rotating point greater than the radial distance from the slanted side portion or the remaining portion of the top surface. When the lever has a circular cross section, the lever would be ineffective because during rotation there is no portion of the lever that would then tend to move into the adhesive towards the interface with the adherent. In the case of the trapezoid shape, when the load is not applied the upper surface does not apply the compressive force for further penetration into the adhesive film towards the bonding interface. As the lever tends to rotate under the shear load, the top outer surface tends to compress the adhesive layer towards the interface for increased shear strength.

The invention is directed to an irregular shape lever, preferably a trapezoid, having an outer surface that has a variable radial distance to a center point about which the lever will tend to rotate, a portion of the surface tending to penetrate into and compress the adhesive for improved shear strength. Different adhesives, lever materials and shapes can be used in a variety of joint configurations. The adherents are preferably constrained so as to reduce tensile stress and peel failure of the joint and so as to maximize the amount of shear strength. Those skilled in the art can make enhancements, improvements, and modifications to the invention, and these enhancements, improvements, and modifications may nonetheless fall within the spirit and scope of the following claims.

What is claimed is:

1. A machine for forming a joint having improved shear strength between adherents upon which may be applied a shear load, the joint comprising,
   an adhesive forming a bonding interface with the adherents, and
   a lever having a center point about which the lever tends to rotate when the shear load is applied to the adherents, the lever having an outer surface at a radial distance from the center point, the outer surface tending to penetrate into the adhesive towards the bonding interface to compress the adhesive towards the bonding interface to increase the shear strength of the joint.

2. The machine of claim of 1 wherein,
   the lever has a trapezoidal shape with a surface comprising the outer surface, the outer surface being at a corner of the trapezoidal shape, the corner tending to penetrate into the adhesive towards the bonding interface to compress the adhesive towards the bonding interface to increase the shear strength of the joint.

3. The machine of claim 1 further comprising,
   a constraint means for constraining orthogonally to the bonding interface the adherent to each other.

4. The machine of claim 1 wherein,
   the lever is embedded in the adhesive for forming an embedded machine.

5. The machine of claim 1 wherein,
   the lever is made of steel.

6. The machine of claim 1 wherein,
   the adherents are constrained orthogonally to the shear load.

7. A machine for forming a joint for improved shear strength between adherents upon which may be applied a shear load, the machine comprising,
   an adhesive forming a bonding interface with the adherents, and
   levers each having a center point about which the levers tend to concurrently rotate when the shear load is applied to the adherents, each of the levers having an outer surface at a radial distance from the center point than a radial distance from the center point to an inner, the outer surface tending to penetrate into the adhesive towards the bonding interface to uniformly compress the adhesive along the bonding interface and towards the bonding interface to increase the shear strength of the joint.

8. The machine of claim 7 wherein,
   each of the levers have a trapezoidal shape with a surface comprising the outer surface, the outer surface being at a corner of the trapezoidal shape, the corner tending to penetrate into the adhesive towards the bonding interface to compress the adhesive towards the bonding interface to increase the shear strength of the joint.

9. The machine of claim 7 wherein,
   the levers are embedded in the adhesive for forming an embedded machine.

10. The machine of claim 7 wherein,
    the adherents are two plates.

11. The machine of claim 7 wherein,
    the levers are disposed in the adhesive forming an embedded machine.

12. The machine of claim 7 wherein,
    the adherents are a tube and a core, the adhesive being disposed between the tube and core.

13. The machine of claim 7 wherein,
    the adherents are a tube and a core, the adhesive being disposed between the tube and core, and
    the levers are joined as a coil around the core embedded in the adhesive.

14. The machine of claim 7 wherein,
    the adherents are an inner tube and an outer tube, the adhesive being disposed between the inner tube and the outer tube, and
    the levers are concentric rings embedded in the adhesive around the inner tube.

15. The machine of claim 7 wherein,
    the adherents are an inner tube and an outer tube, the adhesive being disposed between the inner tube and the outer tube, and
    the levers are a continuous coil of levers embedded in the adhesive around the inner tube.

16. The machine of claim 7 wherein,
    the adherents are constrained orthogonally to the shear load.

* * * * *